May 23, 1972  J. F. SNOW  3,664,647
AERATING SYSTEM

Filed July 22, 1970  3 Sheets-Sheet 1

ROY L. CLOUGH, Jr.
JOHN F. SNOW
INVENTORS.

BY Schiller & Pandiscio

May 23, 1972  J. F. SNOW  3,664,647
AERATING SYSTEM
Filed July 22, 1970  3 Sheets-Sheet 2

ROY L. CLOUGH, Jr.
JOHN F. SNOW
INVENTORS.

BY Schiller & Pandiscio
ATTORNEYS

May 23, 1972  J. F. SNOW  3,664,647
AERATING SYSTEM

Filed July 22, 1970  3 Sheets-Sheet 3

ROY L. CLOUGH, Jr.
JOHN F. SNOW
INVENTORS.

BY Schiller & Pandiscio
ATTORNEYS

United States Patent Office 3,664,647
Patented May 23, 1972

3,664,647
AERATING SYSTEM
John F. Snow and Roy L. Clough, Jr., Bristol, N.H., assignors to Xodar Corporation, Warwick, R.I.
Filed July 22, 1970, Ser. No. 57,171
Int. Cl. B01f *3/04*
U.S. Cl. 261—30
24 Claims

ABSTRACT OF THE DISCLOSURE

Apparatus for introducing fine air bubbles into sewage and waste water of a sewage treatment plant to effect biological purification with air treatment. The apparatus comprises an aerating body that normally has negative buoyancy in the water and is adapted to trap and be rendered buoyant by injected air which escapes into the water when the aerating body rises in the water. The aerating body rises and falls in the water periodically so that it agitates as well as aerates the water.

---

This invention relates to the contacting of liquids and gases and more particularly to aeration of sewage and industrial wastes, stagnant ponds, rivers, pools and the like.

It is common practice in modern aerobic sewage and industrial waste disposal processes to aerate waste effluents to reduce the amount of oxygen required for complete oxidation of suspended organic solids when subsequently discharged from the treatment system into a river or the sea. In a growing number of localities statutes require that the Biological Oxygen Demand (i.e., the amount of oxygen required to oxidize a given amount of waste discharge) not exceed predetermined limits. Accordingly, efficient and reliable aerating equipment is required to adequately aerate the large volumes of liquid effluents which modern waste treatment plants must handle. The usual practice is to direct the liquid effluent into holding lagoons or tanks in finely divided form so that it will pass upwards through the body of liquid and thereby oxidize suspended organic matter. The duration of the aeration cycle is a matter of days, ranging up to about 60 days in lagoons and up to about 30 days in tanks equipped with agitation devices. Once aeration has been completed the effluent is filtered to remove remaining solids, chlorinated and then discharged into a river or the sea.

Various types of means for effecting aeration as above described have been adapted and put into use, as exemplified by U.S. Pats. 3,396,950, 3,063,689, 3,470,091, 3,347,537, 3,182,978, 2,815,943, 2,947,525, 3,133,130, and 3,490,752.

Generally speaking increased aeration results in increased improvement in the efficiency of waste treatment. However, aerating means heretofore known have not been fully satisfactory. Among the limitations of aerating systems now in use or previously known are high installation and maintenance costs, low efficiency resulting in high air input requirements and long aeration cycles, and inability to agitate sludge.

Accordingly the primary object of this invention is to provide a novel method for aerating sewage and industrial wastes in holding lagoons on other containers such as moats, pools, tanks and the like.

A more specific object is to provide improved apparatus for aerating liquid wastes that is relatively inexpensive to install, maintain and operate and which is adapted to release the aerating gas in a manner that provides faster and more uniform dispersion in the form of small bubbles throughout the body of liquid waste and improved bacterial action.

A further specific object is to provide novel waste treatment apparatus that combines the functions of aeration and sludge agitation.

The foregoing and other objects hereinafter described or rendered obvious are achieved by means of a water displacing body disposed in a holding lagoon or tank comprising a sheet attached to and extending across an open frame, means for injecting air below said sheet so as to cause it to balloon in a predetermined manner and to render the body buoyant, and means for causing the body to rise angularly in the lagoon or tank as it is rendered buoyant, the body being adapted to release air from under the sheet as it rises whereby it loses sufficient buoyancy to drop again to its original level. The body rises and falls cyclically according to the rate of air input and air escape, whereby the body of liquid in the lagoon or tank is agitated as well as aerated.

In a preferred embodiment of the invention the body is balloonable and comprises a sheet that is flexible, ballast carried by the frame for causing it to have negative buoyancy whereby it normally will rest at the bottom of the lagoon or pool, and tethering means attached to one end of the body so it will rise angularly when rendered buoyant by injected air. Another embodiment comprises a rigid sheet that bulges out away from the sheet. A third embodiment comprises ballasted means at one end of the body which causes it to rise angularly when rendered buoyant by injected air. Other features and advantages of the invention are described or rendered obvious in the following detailed description which is to be considered together with the accompanying drawings wherein:

Figure 1:
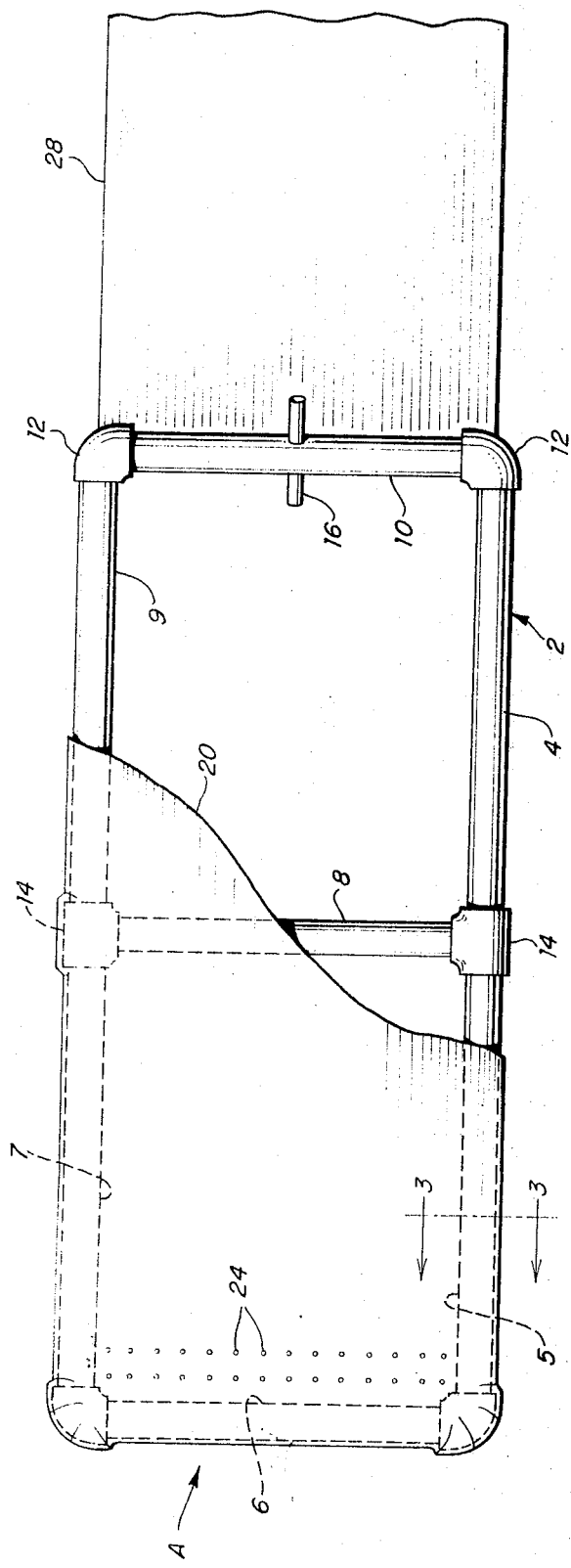
FIG. 1 is a plan view of a portion broken away, of a preferred embodiment of an aerating body constructed in accordance with this invention.
Figure 2:
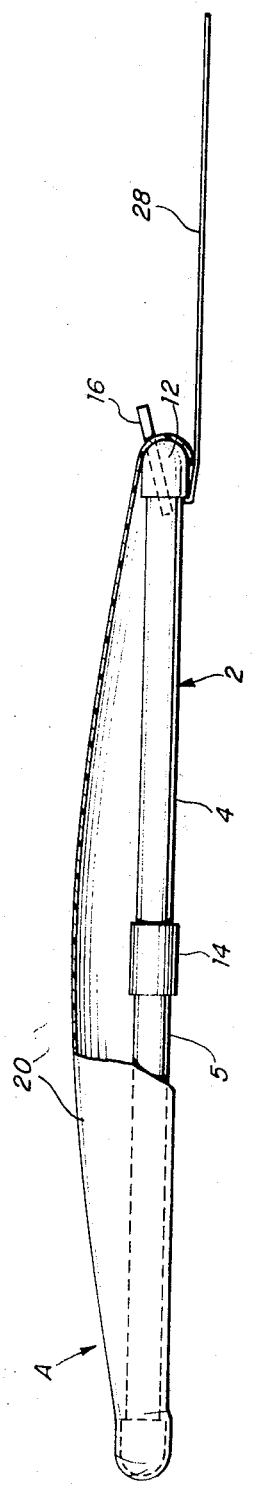
FIG. 2 is a side elevational view, partly in section, of the body of FIG. 1.
Figure 3:
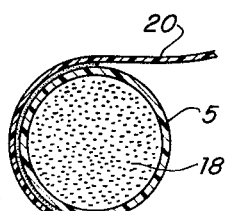
FIG. 3 is a view taken along line 3—3 of FIG. 1.

Referring now to FIGS. 1, 2 and 3, the illustrated aerating body A comprises a rectangular frame 2 with a central cross-brace made up of sections of plastic pipe 4–10 connected together by plastic elbows 12 and T's 14. Secured to and extending transversely through about the midpoint of pipe section 10 is a short hollow tube 16. As seen in FIG. 2, tube 16 extends at an angle to the plane of the frame. The pipe sections and fittings are filled with a suitable ballast material, preferably sand as shown at 18 in FIG. 3. Overlying the frame is a diaphragm 20 in the form of a sheet of flexible water-resistant material. The sides and ends of the sheet extend around the pipe sections and fittings and are secured thereto in a suitable manner, e.g., by means of a strong water-resistant cement as shown at 22 in FIG. 3. It also is contemplated that the sheet could be secured to the frame members by suitable mechanical clamping means. The essential thing is that the sheet should be secured to the frame so that few and preferably no openings are provided between them for escape of air. The sheet is cut and mounted so that the diaphragm 20 can balloon or belly away from the top side of the frame as shown in FIG. 2. Typically with a frame made of 4 inch pipe and measuring about 3½ ft. wide and 8 ft. long, the diaphragm should be able to balloon out about 6 inches at its center. The diaphragm also is provided with a series of small air discharge openings 24, preferably arranged in one or more laterally-extending rows, at the end adjacent to pipe section 6. Preferably the openings 24 are about ⅛ inch in diameter and are located on 3 inch centers. Completing the aerating body is a tether in the form of a sheet 28 of strong flexible water-resistant material which has one end secured to the underside of pipe section 10 and the elbows 12 connected thereto. The sheet 28 is secured to the aerating body by cementing it to the frame or by suitable mechanical clamping means. Preferably the diaphragm 20 and the tether 28 are made of the same material.

Figure 4:
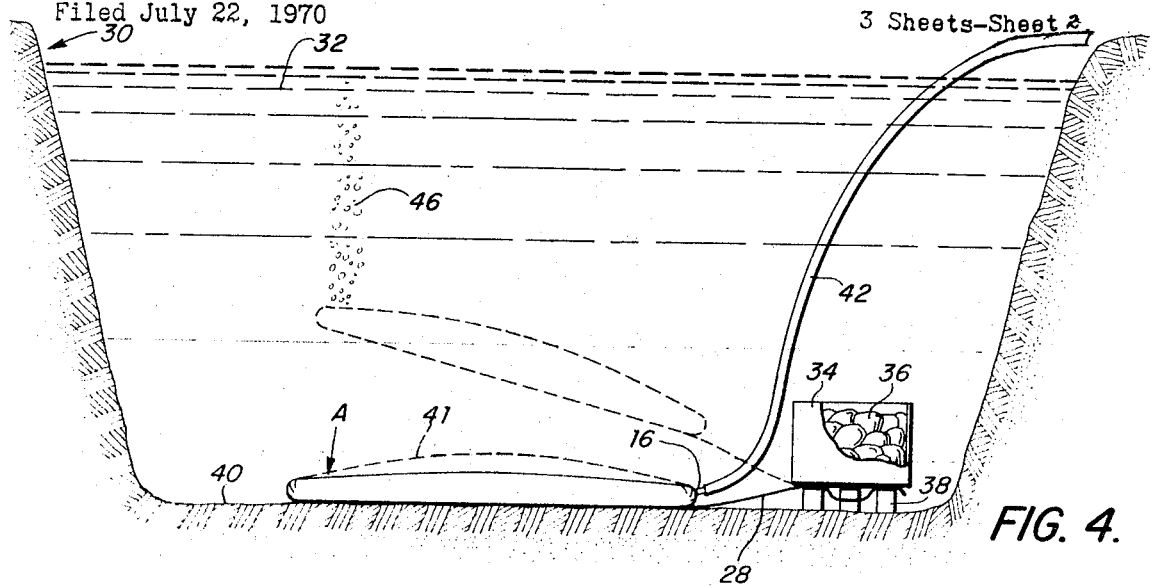
FIG. 4 shows how the aerating body of FIGS. 1–3 is mounted in a lagoon.

Referring now to FIG. 4, the aerating body A is placed in a lagoon 30 filled with the effluent 32 from a waste treatment plant, and the free end of its tether 28 is anchored in the lagoon. Preferably this is achieved by providing a box 34, preferably made of a water resistant material such as cedar or creosote impregnated wood, that is loaded with suitable ballast such as rocks 36.

The box 34 is mounted on and attached to suitable supports 38 which rest on the bottom 40 of the lagoon. The supports may be made of the same material as the box 34. The tether 28 is captivated between the box 34 and the supports 38. Preferably, the central support 38 is formed of two pieces and the tether extends between and is clamped by the two pieces as shown in FIG. 4. Due to the ballast 18 in the frame 2, the aerating body A will normally rest flat on the bottom surface 40 of the lagoon. A flexible air hose 42 is connected to the air inlet tube 16 by suitable connecting means. The other end of the air hose 42 is attached to an air supply (not shown). The air supply may consist of a compressor supplying air to a plenum to which the air hose 42 is connected. Preferably, however, the air supply is a variable flow rate air pump driven by an electric motor.

Aeration of the effluent 32 by means of the aerating body A will now be described. Assuming that no air is flowing through the hose 42, the aerating body A will rest on the bottom 40 of the lagoon due to the negative buoyancy provided by the ballast 18. The diaphragm 20 will tend to rest flat against the upper side of the frame and the space encompassed by the diaphragm and the frame will be filled with effluent. Assuming now that air is supplied by a hose 42, the incoming air will cause the diaphragm to balloon upwardly away from the frame 2. Since the inlet tube 16 is located at one end of the frame, the incoming air will first tend to be concentrated under the diaphragm at that end of the aerating body A. The air introduced will cause the diaphragm to balloon up away from the frame, first in the region adjacent to the inlet tube 16 and then toward the opposite end of the aerating body as more air is injected. This progressive ballooning of successive portions of the diaphragm leading away from the inlet tube 16 introduces a wave motion in the effluent which provides a certain measure of agitation. As the amount of air supplied to the aerating body is increased so as to cause the diaphragm to balloon out fully to the expanded state shown by the dotted line 41 in FIG. 4, the aerating body will begin to assume positive buoyancy and thus will commence to rise in the lagoon. Since the right hand end of the aerating body is tethered, the body will rise at an angle with the tether acting as a hinge. The aerating body will continue to rise until such time as the air introduced thereto has travelled far enough to reach the holes 24, at which time the air will commence to escape from under the diaphragm through those holes in the form of small bubbles as shown at 46. The buoyancy of the aerating body will then commence to diminish until finally the aerating body will again assume a negative buoyancy and will again begin to drop. Notwithstanding, continued inflow of air from hose 42, the aerating body A will drop down to the floor of the lagoon, whereupon the incoming air will again commence to cause the diaphragm to balloon upwardly away from the frame 2, causing the body to rise again in the manner described above. The aerating body will rise and fall in a cyclic manner with the frequency of rise and fall depending upon the number and size of the apertures 24, the length of the aerating body between the inlet air tube 16 and the rate of incoming air. It is to be noted that as the aerating body rises and falls in the lagoon it agitates the effluent and thereby helps keep the solid waste material in suspension in the effluent so that it can be more uniformly aerated. Additionally, the escaping air bubbles provide efficient aeration due to intimate contact with the effluent at various levels.

It is to be noted that the frequency at which the aerating body rises and falls can also be controlled by cyclically introducing air via hose 42. One way in which this can be accomplished is described in connection with the embodiment shown in FIG. 5. It is to be noted also that it is not essential to provide the holes 24 if the primary requirement is for agitation rather than aeration. The holes 24 serve two functions. One function is to release the air in very small bubbles so as to provide more intimate contact with organic matter in the effluent. The second funtion of the holes 24 is to determine the height to which the aerating body will rise before the air entrapped under the diaphragm is allowed to escape. If the air holes are omitted, the aerating body will tend to rise higher in the lagoon until such time as the air trapped beneath the diaphragm can escape from under the frame at the upper end of the aerating body. While the air released in this manner will accomplish some aeration, it is not efficient since it is not released as small bubbles.

Figure 5:
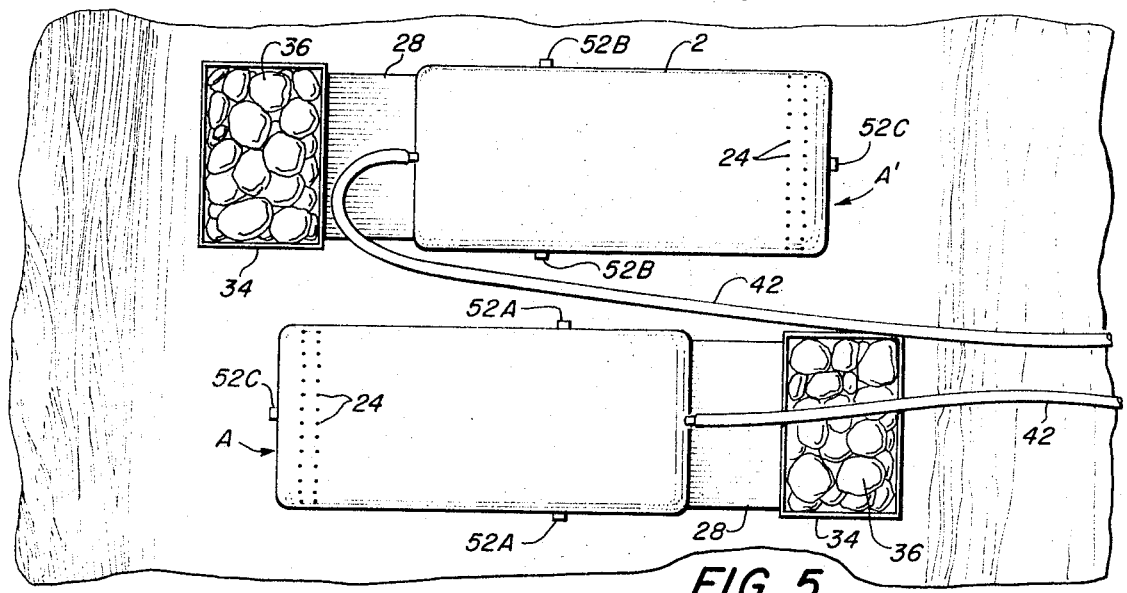
FIG. 5 is a plan view showing two aerating bodies mounted in a lagoon.

Obviously the aerating body may be oriented so that its tether extends either transversely or longitudinally in the lagoon. Furthermore, more than one aerating body may be used in the same lagoon and they may be located either close together or in widely spaced relation to each other. In FIG. 5 two identical aerating bodies A and B are mounted so that their anchor points are at opposite sides of the lagoon. The aerating bodies in FIG. 5 are essentially the same as described above and hence corresponding elements are represented by corresponding numerals. The air hoses 42 which are connected to the two aerating bodies are coupled to a suitable air source which may be adapted so that air is supplied to both aerating bodies simultaneously or alternately.

Figure 6:
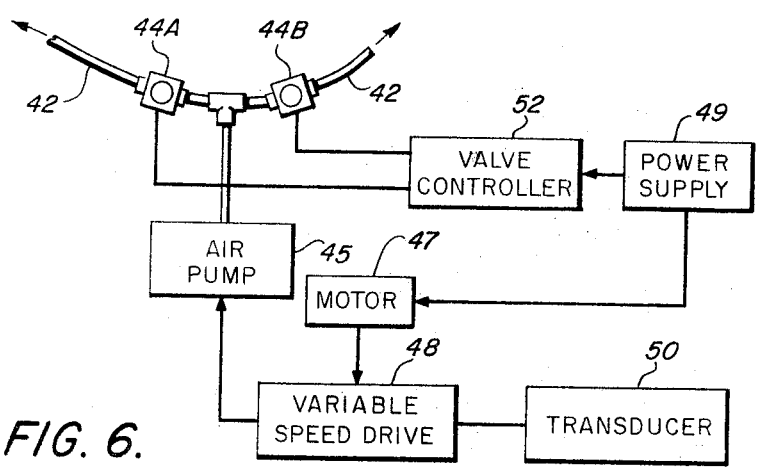
FIG. 6 is a schematic representation of one form of controllable air supply system for operating the two aerating bodies of FIG. 5.

FIG. 6 illustrates schematically one form of air supply system for operating the two aerating bodies shown in FIG. 5. The illustrated system comprises two solenoid controlled valves 44A and 44B having their discharge ports connected to the hose lines 42 of aerating bodies A and B respectively and their inlet ports connected to an air source comprising an air pump 45 and a constant speed electrical motor 47 that drives the pump through a variable speed drive 48 which acts as an air source controller. The motor is energized by a suitable power supply 49. By way of example the air source may be a Model 325 motor driven air pump produced by Schwitzer Division of Wallace-Murray Corp. of Indianapolis, Ind. The variable speed drive 48 is adapted to vary and control the pump speed and thus the rate at which air is supplied to the aerating bodies. The variable speed drive may take various forms and may be adapted for manual control or for automatic control according to measured characteristics of the effluent. By way of example the variable speed drive may be an electromagnetic particle clutch of suitable size embodying, for example, the type of construction described in U.S. Pats. 3,394,783 or 3,394,784, with the degree of clutching between the motor's output shaft and input shaft of the pump depending upon the amount of current supplied to the energizing coil of the clutch. Alternately the variable speed drive may be a Reeves-type electrically controlled unit or an eddy coupling as described in Fitzgerald, Basic Electrical Engineering, pp. 422–423, McGraw-Hill (1945). A further suitable variable speed control arrangement is provided by replacing motor 47 with a variable speed D.C. motor and replacing the variable speed drive with a rheostat or potentiometric type controller. In any event the air source controller must be able to vary the pump speed directly or through motor 47 in response to an input signal derived from one or more transducers 50 which are adapted to measure important characteristics of the effluent such as temperature or pH or oxygen content and to supply an input signal to the controller that varies in accordance with the measured characteristics. By way of example, the transducer 50 may be a temperature measuring device, e.g. of the resistor-bulb type, or an electrode for measuring pH or oxygen content such as shown in U.S. Pats. 2,705,220, 2,232,211 and 2,913,386, such transducer or transducers being disposed at a suitable location in the effluent in the lagoon so as to continuously monitor the effluent as it is being aerated and agitated. It is to be noted that the bacterial action proceeds slower at low temperatures and over-oxygenating may kill the bacteria. Hence temperature monitoring may be required in those installations where large changes in temperature are likely to occur.

Operation of the solenoid valves 44 is determined by a suitable valve controller 52 which may be adapted so that valves 44 will supply air to both aerating bodies simultaneously or alternately. Valve controller 52 may be a cam-type motor-driven controller comprising a cam which operates switches that control energization of the solenoids of the two valves 44 from power supply 49. Preferably, however, the valve controller 52 takes the form of two pairs of level-sensitive mercury switches 52A and 52B with each pair attached to opposite sides of one of the aerating bodies as shown in FIG. 5. The switches 52A on the aerating body A are connected in parallel with each other and in series with the solenoid of valve 44A and the other pair of switches 52B are similarly connected in parallel with each other and in series with the solenoid of valve 44B. The switches 52A ad 52B are normally closed when the aerating bodies are level, e.g. when the aerating bodies rest flat on the bottom of the lagoon and are mounted so as to open when the aerating bodies rise to predetermined angle of tilt. The solenoids of valves 44A and 44B are energized and the valves are open so long as both of their respective mercury switches are closed and the solenoids are deenergized and the valves close when both of their respective mercury switches are opened. Hence valves 44A and 44B supply air to the aerating bodies to render them buoyant until they have risen to a predetermined level and then further flow of air is terminated until the aerating bodies have dropped back down in the lagoon far enough for the switches to reclose. Obviously only one mercury switch is required for each aerating body but use of two switches per body is preferred for more accurate control. The control system of FIG. 6 allows the two aerating bodies to be operated in phase or out of phase with each other. Preferably they are operated 180 degrees out of phase with each other so that one is at the bottom of the lagoon when the other is high enough for its mercury switches to open. Operating them in phase is achieved by introducing air simultaneously to both aerating bodies while they are on the bottom. Thereafter, since the diameters of the lines leading from the air pump to both are the same, and since the aerating bodies are identical in construction with their switches mounted at the same points thereon, the two aerating bodies will go up and down together. However, operating them out of phase with each other has been found to produce better effluent agitation. To achieve this out of phase operation it is necessary to introduce air to only one aerating body until it has risen to the point where its mercury switches open and then introduce air to the other aerating body. Thereafter, because of the control effected by the mercury switches, they will continue to operate out of phase with each other. More precise control to achieve 180 degree out-of-phase operation can be achieved by mounting on each aerating body a mercury switch 52C that is normally open when the body is level and which closes when the body reaches the upper end of its stroke, and connecting to switch 52C on one aerating body to a normally open relay (not shown) that is in series with the mercury switch or switches of the other aerating body, so that the relay is not activated to close the mercury switch circuit of the other body until the one aerating body reaches its maximum height but will drop out when the mercury switch or switches of the said other body closes or close as above described.

It is to be appreciated that although the frame 2 is preferably made of plastic pipe and pipe fittings, it also may be made of a suitable metal or metal alloy that is capable of withstanding corrosion in the effluent being treated. Plastic pipe is preferred because of its low cost and because it is available in compositions which are resistant to the effluent and the solids suspended in the effluent. Preferably the frame is made of polyvinylchloride pipe and fittings. Making the frame of plastic or metal pipe offers the advantage that the frame is hollow and thus is adapted to accommodate suitable ballast. The amount of ballast required depends upon the size of the aerating body and also its weight, so that less ballast is required if the frame is made of metal or a metal alloy and more ballast is required if the frame is made of plastic. It is also recognized that the frame could be made of wood, the same as the box 34, in which case provision must be made for providing the frame with ballast sufficient to cause the aerating body to sink to the bottom of the lagoon when air is not being introduced. Obviously, the ballast could be solid material rather than sand or gravel, but the latter is preferred because of lower cost.

The diaphragm 20 and the tether 28 may be made of various materials. While they may be made of an elastomer material such as rubber or a rubber-like composition, it is preferred that they be made of materials that are not elastomers. The essential requirement is that the material be impervious to the effluent and to the aerating fluid, sufficiently strong to withstand the operating pressure, and capable of being securely anchored to the frame. Preferably the diaphragm and the tether are made of a plastic such as polyvinylchloride, polyethylene, polypropylene and the like. It is also contemplated that the diaphragm may be reinforced. This can be achieved by embedding flexible reinforcing elements such as glass or metal filaments directly into the sheet material or by cementing flexible reinforcing elements such as nylon tape directly to the surface of these sheets. The reinforcing elements also may be applied to the edges of the tether and the diaphragm so as to provide reinforcement in those locations.

Of course, it is not necessary for the aerating body to be rectangular as shown. Thus, the aerating body may be square or may be trapezoidal, with the non-parallel sides extending between the tether and the free end of the aerating body.

It also is not necessary for the diaphragm 2 to be made of a flexible sheet. Instead it may be a stiff sheet; however, it must be shaped to provide a bulge contour as shown at 41 in order for the aerating body to be able to rise in the manner described to a satisfactory height. If the diaphragm 20 is a flat rigid sheet, the aerating body will rise only a little before the air that is under it will escape, with the result that the aerating body will have a relatively short up and down stroke. The bulge allows a substantial amount of air to be entrapped below the diaphragm to render the aerating body buoyant and presents the entrapped air from escaping until the body has risen to an appreciable height, i.e. until the escape holes 24 are at the same level as the bulged portion of the diaphragm. The bulge must be lengthwise of the body, i.e. extending from the tethered end to the free end to be effective, but preferably it also is curved side to side as in the embodiment of FIG. 1 in order to increase the amount of air that can be entrapped. Thus a further embodiment of the invention consists of replacing the flexible diaphragm 20 shown in FIGS. 1 and 2 with a rigid diaphragm molded so as to have convex contour as shown at 41 in FIG. 4, and optionally with a smaller contour for side to side, i.e. from frame members 4, 5 to frame members 7, 9.

Figure 7:
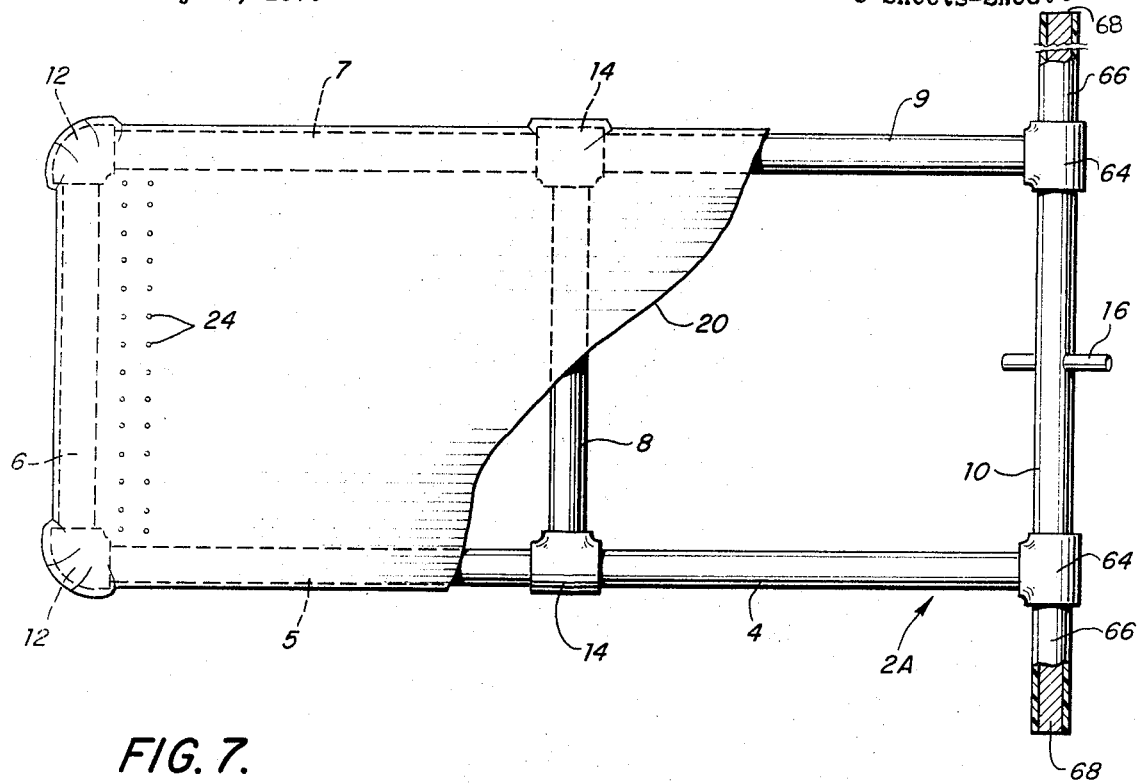
FIG. 7 is a plan view of another embodiment of the invention.
Figure 8:
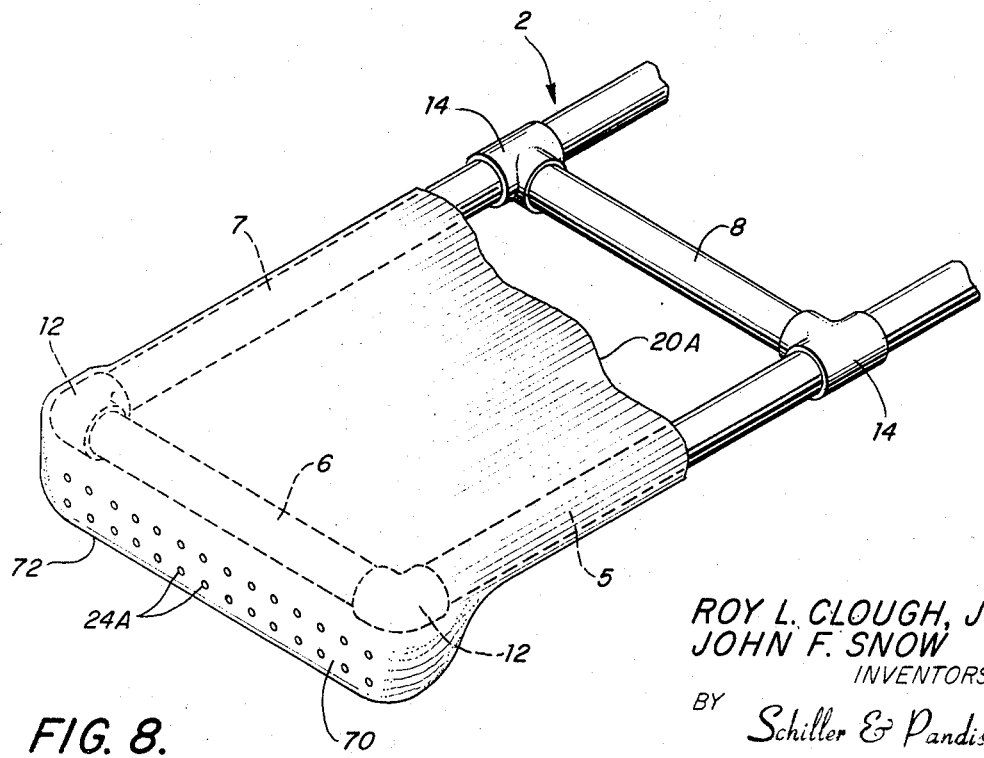
FIG. 8 is a fragmentary perspective view of another embodiment of the invention.

FIGS. 7 and 8 show still other modifications of the invention. The embodiment of FIG. 7 differs functionally from that of FIG. 1 in that it does not require the tethered arrangement. In the embodiment of FIG. 7 the frame 2A is the same as the frame 2 of FIG. 1 except that the end which is remote from the air discharge holes 24 has T's 64 in place of the elbows 12 and pipe sections 66 mounted in the T's 64. The pipe sections 66 extend laterally of the frame 2A for enough to stabilize the aerating body when it rises upwardly as hereinafter described. The pipe section 66, T's 12 and the connecting pipe section 10 are all filled with lead or similar high density ballast as shown at 68. The remainder of the frame is ballasted with a lighter density material, e.g., sand, as the frame 2. In practice the aerating body shown in FIG. 7 is placed in the lagoon where it will sink to the bottom due to being ballasted. Preferably, although not necessarily, the aerating body of FIG. 7 may be anchored to the bottom of the lagoon by suitable means, such as a chain (not shown) attached to one of the pipe sections 66, so as to prevent it from drifting in the lagoon. When air is introduced to the aerating body of FIG. 7 by way of the tube 16, the flexible diaphragm 20 will balloon away from the frame in the manner described above in connection with the embodiment of FIG. 1 and the aerating body will be rendered buoyant due to the trapped air. As the aerating body is rendered buoyant, the end at which the holes 24 are located will begin to rise while the opposite end will remain on the bottom of the lagoon due to the weight of the lead ballast 68. Thus essentially the aerating body will pivot upwardly on an axis provided by the pipe section 66, the T's 64 and the pipe section 10. The aerating body will drop again as soon as the air entrapped below the diaphragm 20 begins to escape through the discharge hole 24. It is believed to be apparent that the embodiment of FIG. 7 offers an advantage over the embodiment of FIG. 1 in that it does not require the tether sheet 28 and the ballast box 34. Obviously the diaphragm 20 may also be a stiff sheet premolded so as to bulge out in the manner described above.

FIG. 8 shows still another modification of the invention which may be incorporated in aerating bodies of the types described above. According to this modification the diaphragm 20A is formed so as to provide a skirt 70 at the end of the aerating body that moves up and down in the lagoon. The skirt 70 may depend straight down from the frame 2 or it may be inturned along its bottom edge 72. The skirt is provided with a series of air discharge holes 24A immediately below the pipe section 6. The holes 24A have the same size as the holes 24 of FIG. 1. It is to be noted that the diaphragm does not have air discharge holes located in the same position as the holes 24 of FIG. 1 and that discharge of entrapped air takes place through the holes 24A. The aerating body shown in FIG. 8 functions essentially in the same manner as those of FIGS. 1 and 7. As air is introduced through a tube mounted similarly to the tube 16 in FIG. 1, it will collect beneath the diaphragm and as additional air is introduced, the entrapped air will move along beneath the diaphragm until it reaches the discharge holes 24A, whereupon it will commence to escape through those holes. Because the holes 24A are below the level of the main portion of the diaphragm 20 which bulges out in the manner shown at 41 in FIG. 2, a substantial amount of the air is entrapped to render the body buoyant and such entrapped air does not escape until the aerating body has risen sufficiently for the air to reach the discharge holes 24A.

Still other modifications will be obvious to persons skilled in the art.

It is believed to be apparent from the foregoing description that this invention offers a number of advantages. For one thing, the aeration body is relatively inexpensive and easy to construct and install. Secondly, it is easy to maintain and to remove for inspection and repair. Another advantage is that a plurality of these aerating bodies may be positioned in one lagoon at selected points to optimize aeration and agitation. Another advantage of the invention is that the aerating device may be installed in lagoons or tanks wherein effluent to be treated is introduced and removed periodically or in systems where effluent flows continuous at a slow rate in a long lagoon. A further advantage is that the aerating device agitates as well as aerates with the result of more uniform dispersion of aerating fluid so that the amount of air required to produce a given B.O.D. level is minimized since a greater proportion of the air introduced is intimately contacted with the organic matter in the effluent. Also, although best results are achieved if the aerating device does not rise to a height closer than 1–2 feet from the surface of the effluent during operation, it also is contemplated that its rise may be great enough for its free end to come out of the water at the end of its upward stroke. Of course, oxygen or some other oxygen-bearing gas may be used instead of air. The same aerating devices may be used to aerate stagnant ponds and pools, rivers and the like. Still other advantages are believed to be obvious to persons skilled in the art.

What is claimed is:

1. In combination with a holder for a liquid having lateral boundaries and a bottom, an aerating system for simultaneously aerating and agitating said liquid, said system comprising:

a body disposed in said liquid so that it can rise and fall in said liquid, said body normally having a negative buoyancy in said liquid and being adapted to trap a quantity of air sufficient for it to have a positive buoyancy in said liquid, said body also being adapted to release said trapped air so that it is distributed into said liquid as said body rises in said liquid due to said positive buoyance; and means for supplying air so that said air is trapped by said body.

2. The combination of claim 1 wherein said body has holes at one end thereof for releasing said trapped air.

3. In combination with a holder for a liquid suspension having lateral boundaries and a bottom, an aerating system having an aerating means that is adapted to rise and fall in said liquid so that said liquid is simultaneously aerated and agitated, said aerating means comprising a balloonable body which normally has negative buoyancy in said liquid, and said system also including means for supplying air to said balloonable body so that said body will have a positive buoyancy and rise in said liquid, said body being adapted so that the air which renders it buoyant is distributed into said liquid as said body rises to a predetermined level, whereby said body will again have a negative buoyancy.

4. The combination of claim 3 wherein said body is disposed so as to rise and fall angularly in said liquid.

5. The combination of claim 3 wherein said air supply means includes means for adjusting the rate at which air is supplied to said balloonable body.

6. The combination of claim 3 wherein said body comprises an open frame and a flexible diaphragm attached to and extending across the upper side of said frame, and said air supply means comprises means for injecting air into the space encompassed by said frame below said diaphragm so as to displace water in said space and cause said diaphragm to balloon upwardly away from said frame.

7. The combination of claim 6 further including means for adjusting the rate of air injection.

8. The combination of claim 4 wherein said frame is constructed of tubular members and further wherein said tubular members contain ballast.

9. The combination of claim 6 wherein said body is tethered at one end, and further wherein said diaphragm is provided with a plurality of holes remote from said one end for escape of air ballooning said diaphragm.

10. The combination of claim 7 wherein the rate of air injection is adjusted according to changes in a characteristic of said liquid.

11. The combination of claim 8 wherein said membrane is made of a plastic material.

12. In combination with a holder for a liquid having lateral boundaries and a bottom, an aerating system comprising:
an aerating body in said holder that is adapted to rise and fall in said liquid so that said liquid is simultaneously aerated and agitated by said body, said body comprising a frame and a diaphragm attached to and extending across said frame, said diaphragm having an underside with a convex curvature along one axis thereof, said body normally having a negative buoyancy in said liquid and being adapted to rise angularly when rendered buoyant by injection of air beneath said diaphragm, and means for injecting air into the space below said diaphragm so as to displace liquid from said space and render said body buoyant, said body further being adapted to release air entrapped in said space below said diaphragm when said body has risen to a predetermined angular position.

13. The combination of claim 12 wherein one end of said body is ballasted so as to have greater negative buoyancy than the opposite end thereof.

14. The combination of claim 12 wherein said diaphragm has air discharge holes at one end of said body for releasing said entrapped air.

15. In a holder for a liquid having lateral boundaries and a bottom, the improvement comprising at least two aerating means each adapted to rise and fall in said liquid so that said liquid is simultaneously aerated and agitated by each of said aerating means, each of said aerating means normally having a negative buoyancy in said liquid and being adapted to trap a quantity of air sufficient for it to have a positive buoyancy in said liquid, each of said aerating means also being adapted to release said trapped air as said aerating means rises in said liquid due to said positive buoyancy, and means for supplying air to each of said aerating means.

16. The combination of claim 15 wherein said air supplying means is adapted to supply air alternately to said aerating means, whereby said aerating means will rise and fall in said suspension at different times.

17. The combination of claim 15 wherein the frequency of up and down movement is determined by the rate at which air is supplied to said aerating means.

18. The combination of claim 15 wherein said aerating means are tethered so that they will not rise to the surface of said suspension.

19. A method of adding oxygen to and agitating a body of liquid comprising placing in said body an aerating device that normally has negative buoyancy and hence will sink in said liquid, injecting a molecular oxygen gas into said body so that it is trapped by said device and causes said device to rise in said liquid, releasing the gas entrapped by said device in the form of bubbles as said device rises so that said device will sink again in said liquid when the amount of entrapped gas is insufficient to overcome said negative buoyancy, and continuing the injection and release of gas so that said device will rise and sink cyclically in said body of liquid.

20. Method according to claim 19 wherein said gas is injected continuously into said body.

21. Method according to claim 19 wherein the injection of said gas is terminated when said device has risen to a first predetermined level and is started again when said device has sunk to a second predetermined level.

22. In combination with a holder for a liquid, an aerating means for simultaneously aerating and agitating said liquid, said aerating means comprising a body disposed in and adapted to rise and fall in said liquid, said body normally having a negative buoyancy in said liquid and being adapted to trap a quantity of air sufficient for it to have a positive buoyancy in said liquid, said body also having holes disposed so as to release air trapped by said body in the form of bubbles as said body rises in said liquid due to said positive buoyancy, and means for supplying air to said aerating means for trapping by said body.

23. The combination of claim 22 wherein said means for supplying air comprises a variable flow rate air pump and conduit means connecting said pump and said aerating means.

24. A method of aerating and agitating a body of liquid comprising placing in said body an aerating device that normally has negative buoyancy and hence will sink in said liquid, injecting air into said body so that it is trapped by said device and causes said device to rise in said liquid, releasing the air entrapped by said device in the form of bubbles when said device has risen a predetermined distance in said liquid so that said device will sink again in said liquid, and continuing the injection and release of air so that said device will rise and sink cyclically in said body of liquid.

References Cited
UNITED STATES PATENTS

| | | | |
|---|---|---|---|
| 1,849,146 | 3/1932 | Kraut | 261—122 |
| 2,144,385 | 1/1939 | Nordell | 261—122 |
| 2,328,655 | 9/1943 | Lannert | 261—122 |
| 2,947,525 | 8/1960 | Klein | 261—122 |
| 1,250,303 | 12/1917 | Greenawalt | 261—81 |
| 2,584,202 | 2/1952 | Harp, Sr. | 261—81 |
| 2,997,284 | 8/1961 | Nechine | 261—122 |
| 2,978,234 | 4/1961 | Lamb | 261—122 |
| 51,128 | 11/1865 | Bickford | 261—81 |
| 3,083,953 | 4/1963 | Langdon et al. | 261—122 |

TIM R. MILES, Primary Examiner

S. H. MARKOWITZ, Assistant Examiner

U.S. Cl. X.R.

261—39, 64, 81, 120, 122